United States Patent [19]

Krone et al.

[11] Patent Number: 4,622,804

[45] Date of Patent: Nov. 18, 1986

[54] MACHINE WHICH IS PULLED OR PROVIDED WITH A THREE-POINT ATTACHMENT TO A TRACTOR AND USED FOR THE HARVESTING OF CORN AND SIMILAR STALK-LIKE CROP

[75] Inventors: Bernard Krone, Spelle; Wilhelm Ahler, Stadtlohn, both of Fed. Rep. of Germany

[73] Assignee: Maschinenfabriken Bernard Krone GmbH, Spelle, Fed. Rep. of Germany

[21] Appl. No.: 624,693

[22] Filed: Jun. 26, 1984

[30] Foreign Application Priority Data

Jul. 9, 1983 [DE] Fed. Rep. of Germany ....... 3324899

[51] Int. Cl.⁴ .................... A01D 45/02; A01F 29/02
[52] U.S. Cl. .................... 56/13.9; 56/291; 56/500
[58] Field of Search .............. 56/12.8, 13.3, 13.4, 56/13.9, 98, 290, 291, 327 R, 500, 504

[56] References Cited

U.S. PATENT DOCUMENTS

| 1,960,596 | 5/1934 | Rimple | 56/14.9 |
| 2,946,169 | 7/1960 | Soteropulos | 241/101.7 |
| 4,207,726 | 6/1980 | Lippl | 56/13.4 |
| 4,271,662 | 6/1981 | Andersson et al. | 56/13.4 |
| 4,276,737 | 7/1981 | Henning | 56/12.8 |
| 4,335,567 | 6/1982 | Comer | 56/13.4 |

FOREIGN PATENT DOCUMENTS

| 1279994 | 10/1968 | Fed. Rep. of Germany | 56/192 |
| 161035 | 8/1979 | Netherlands | 56/DIG. 14 |

Primary Examiner—Gene Mancene
Assistant Examiner—David I. Tarnoff
Attorney, Agent, or Firm—Jordan and Hamburg

[57] ABSTRACT

The invention relates to a machine which is pulled or attached to a three-point attachment on a tractor and used for the harvesting of corn or similar stalk-like crops. The machine has a cutting device and a chopping blower arranged subsequent thereto with slide-in rollers to which the crop is supplied by a cross-conveyor running transversely to the direction of travel of the tractor. The cross-conveyor is designed as a cutting and supplying device, cutting the crop at any point in the working area, holding it above the cut area and supplying it in an approximately upright or inclined position, opposite to the conveying direction, to the slide-in rollers or a chopping machine with simultaneous release.

43 Claims, 10 Drawing Figures

MACHINE WHICH IS PULLED OR PROVIDED WITH A THREE-POINT ATTACHMENT TO A TRACTOR AND USED FOR THE HARVESTING OF CORN AND SIMILAR STALK-LIKE CROP

BACKGROUND OF THE INVENTION

The invention relates to a machine which is pulled or provided with a three-point attachment to a tractor for the harvesting of corn or similar stalk-like crops.

A known machine of this type (DE-AS 20 63 691) is designed as a single-row harvester and has a feeding and supplying device, arranged above a special cutting device, for transporting the crop to be chopped in and transversely to the direction of travel. The feeding and supplying device consists of three different parts each of which is driven separately. A conveying part, formed by an endlessly rotating chain or belt conveyor, which is driven and has driver elements, is guided by guide wheels. An additional endlessly rotating driven conveyor together with the first conveying part forms a feeding area which narrows towards the rear and opposite to the direction of travel of the machine and simultaneously ascends obliquely in an upward direction. Also a cross conveyor rotating around a horizontal axis above the depot area is obliquely inclined in a downward direction.

Because of its construction, this known machine can only receive one row of the standing crop during the chopping process, which already in and of itself limits the chopping performance. In this known machine, the crop is initially supplied in the direction of travel and then redirected and inclined transversely to the direction of travel. For this, three feeding and supplying devices with special drives and deflection and guide plates are required which are comparatively complicated to construct, thus making the manufacture correspondingly more expensive.

In addition, a harvester for stalk-like crops is known which has a feeding and supplying device and which consists of at least two chains, belts or the like, rotating on the same plane in a countercurrent direction, onto which an elastically deflectable belt is fastened, forming guide loops of the same length at equal distances. The corn stalks are grasped in an upright position, cut and delivered with their ends first to a continuing processing device without the danger that the corn stalks will get hooked onto the conveying parts which could result in a clogging of the device (DE-PS 15 07 187). In this known machine, the corn stalk is held in an already upright position and supplied to the continuing processing device.

However, an additional cutting device is required for the cutting of the corn stalks and the like. Furthermore, the feeding and supplying device can only receive the crop at one feeding point between the respective guide wheels and then convey it opposite to the direction of travel. This requires a special row arrangement of the crop to be harvested. Furthermore, a complete feeding and supplying apparatus with a prearranged cutting device is required, in the case of a multiple-row construction of the machine, for each row of crop which is to be harvested at the same time. In this case as well, the machine is relatively complicated from a construction and manufacturing standpoint. Since the machines are used by various companies, it is a disadvantage that only such crop can be chopped with the machine which is already located during the spring planting at a row distance which was adjusted to the machine.

Finally, a transportable chopper for straw and tuber harvests, in particular for rape, is known (DE-GM 77 13 772), which comprises a mowing device, a processing device in the form of a cutting and ejection blower with attached ejection pipe arranged transversely to the direction of travel of the tractor and a conveying device arranged between this, the conveying device consisting of a conveyor belt and a cross spiral conveyor.

The cross spiral conveyor is located in a conveyor housing which is partially formed as a cylindrical surface serving as a counter edge at the transfer point to the cutting and ejection blower. At the scoop wheel of the cutting and ejection blower there is a cutting knife which, together with the counter edge, forms the cutting device. Since this chopper has no slide-in roller or the like, it is not suitable for the harvesting of corn or similar stalk-like crops. However, if this cutting and ejection blower were to be provided with a cutting channel with slide-in rollers, the cutting and ejection blower would have to be of a large size in order to maintain adequate conveyor performance, that the counter edge of the cutting channel would be located considerably higher than the cutting point of the crop to be harvested on the ground. Therefore, it has to be connected to a feeding device conveying in an upward direction from the ground.

It is the object of the invention to provide a machine which is pulled or attached to a three-point attachment on a tractor for the harvesting of corn or similar stalk-like crops. The machine according to the present invention, in its entire working width, receives and subsequently chops the stalk-like crop, and thus operates independent of the row distances of the grown crop. Also the cutting and ejection blower is compact and small such that the counter edge of the cutting channel is located at or shortly above the cutting height of the crop.

In the machine according to the invention, the intended chopping machine is obtained by the special design and arrangement of the cross conveyor as the cutting and supplying device in front of the chopping and scoop wheels which are driven in a countercurrent fashion and which work together with a cutting channel and a joint counter edge, cutting the stalk-like crop growing in the field of the same height from the ground across the entire working width of the machine, and subsequently chopping and conveying it to a collection vehicle like, for example, an agricultural trailer. No special row distance of the crop is required since the stationary cutting knife for the cutting of the crop, arranged across the entire working width and transversely to the direction of travel of the machine, is permanently merged by crescent-shaped counter edge members on a continously rotating chain system which is endless and directed parallel to the ground so that there is always a cutting preparedness. However, in practice, there exists the possibility that a stalk divider and/or guide sheet delineates and divides the standing crop at the cutting area. The chain system, having a plurality of counter edge members, holding fingers and braces, receives the crop stalk, cut by the counter edge member above the cutting point, by the holding finger and brace associated with the counter edge member and carries the crop stalk, for example the way a standard bearer carries a standard, to a subsequent chopping machine. This is very small and compact because of the arrangement of two chopping and scoop wheels with their own blower housings and joint cutting channel in a direction perpendicular to the plane of travel. The construction height corresponds approximately to half the construction height of a traditional chopping blower with the same chopping and conveying performance. In two chopping and scoop wheels, the maximum stresses of the drive can be lowered, since there is a consecutive cut in the cutting channel so that always only one chopping knife of a chopping and scoop wheel cuts on the counter edges. In order to achieve the peripheral speed of a large chopping and scoop wheel, the rotational speed can be increased when arranging two smaller chopping and scoop wheels so that the conveying performance is adjusted and the cutting sequence for a very short chopping of the crop can be increased.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

In the preferred embodiment of the machine 1, as illustrated in the drawing, for the harvesting of corn or similar stalk-like crops 2, the entire machine is suspended on a three-point suspension 3 of a tractor 4 by means of a supporting frame 5 with adjustable connecting parts 5'. However, the machine 1 can be designed as a pulling machine a well, illustrated and described, for example, in DE-AS 12 05 334, with respect to the chassis and connection parts. In this case, the machine is supported via the supporting frame 5 on non-illustrated wheels and is suspended by means of a non-illustrated pull rod or wagon shaft on tractor 4 and moved by this. An embodiment as a self-driven machine with its own drive engine is possible as well.

Figure 1:
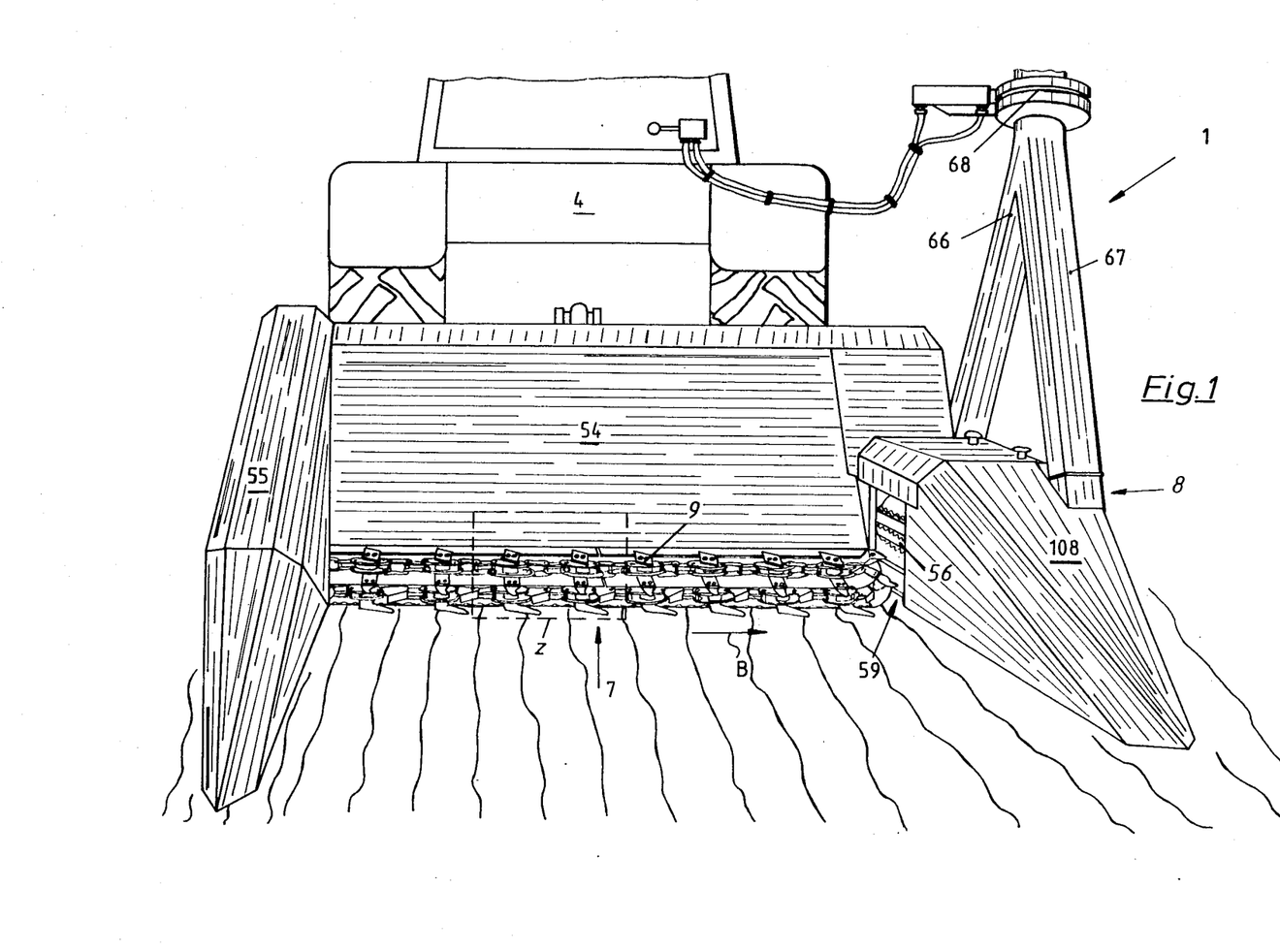
FIG. 1 is a perspective view, seen obliquely from above, of a machine according to one embodiment of the present invention for three-point attachment on a tractor in reverse drive opposite to the direction of travel.
Figure 2:
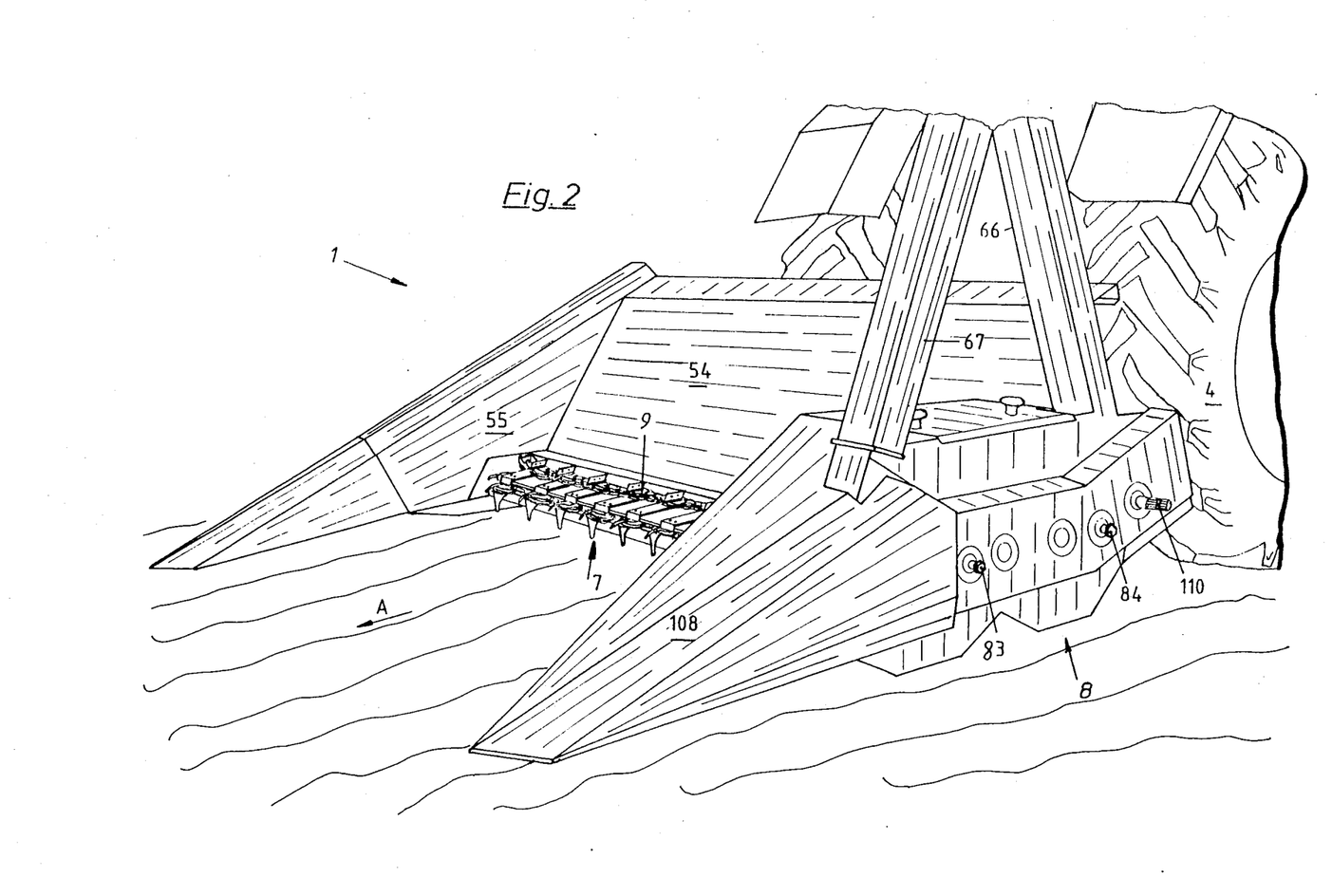
FIG. 2 is an additional perspective view, similar to FIG. 1, seen from an angle of approximately 45° to the plane of the direction of travel.
Figure 3:
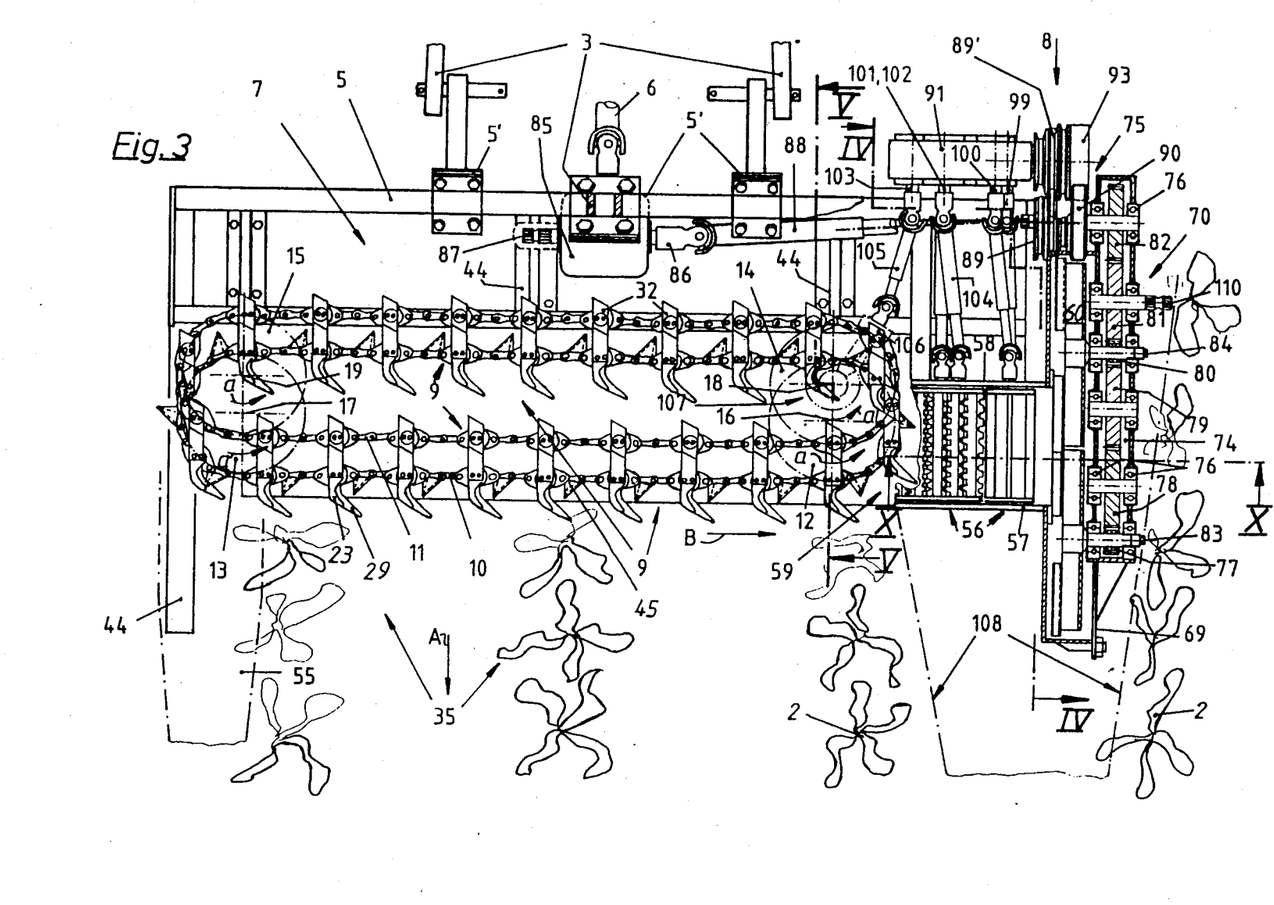
FIG. 3 is a plan view of the machine according to the invention without the cover and guide sheet with the guide wheels illustrated only with broken lines and constituting a partial crosssection taken along the line III—III in FIG. 4.

As particularly illustrated in FIGS. 1 to 3, the machine 1 is moved during the reverse movement of the tractor 4, while supported by the three-point suspension 3, in the direction of travel A, which can be seen as the direction of work as well, and driven via a drive shaft 6 by the tractor. Besides the supporting frame 5, the machine has a cutting and supplying device, designated as a whole by the numeral 7, and a chopping machine 8 arranged transversely to the direction of travel A. The cutting and supplying device 7 consists of a chain system 9, rotating transversely to the direction of travel A, having two rotating endless chains 10, 11 with sprockets or guide wheels 12, 13, 14, 15, the axle center of which 16, 17, 18, 19 are directed approximately perpendicularly and disposed parallel to one another. The two chains are staggered in horizontal planes and in the direction of travel A and are located at a small distance above one another, crossing one another at two points and running in the direction of arrow a. Two guide wheels 12, 13 and the endless chain 10 or the guide wheels 14, 15 and the endless chain 11, respectively, cooperate with preferably only the guide wheel 14 being driven. The guide wheels 12, 13, 14, 15 are mounted on shafts 20, 20' by, for example, two grooved ball bearings 21, 21'. The shafts 20, 20' are mounted on both sides in or on the supporting frame 5. The endless chains 10, 11 are preferably formed of equal lengths of long link-roll chains with special links or bearing lugs 22.

Into these special links or bearing lugs 22, which are preferably spaced every 0.2 m, the endless chains 10, 11 with holding fingers 23 and their extended part 23' are rotatably connected to one another with the pins or shafts 24, 25. The connection is such that the shafts 24, 25 are somewhat longer than the length of the interior sleeve 26 of the special links or the bearing lugs 22 and have two through-holes 27 which receive two threaded members or bolts having hexagonal recessed holes 28. A counter edge member 29 has two thread borings 30 which threadedly receive the threaded members and which can be connected underneath the special link or bearing lug 22 with the holding finger 23 which is arranged above. The holding fingers 23 and the counter edge member 29 are thus connected parallel and at a distance spaced from one another via shafts 24, and held and guided rotatably in the special link or bearing lug 22. The extended part 23' of the holding finger 23 is similarly connected with a special link or bearing lug 22 of the endless chain 11, which is directed exactly like the endless chain 10 but located at a higher elevation and staggered opposite to the direction of travel A towards the rear. Two threaded holes 31 are provided in the extended part 23' through which the fastening onto the endless chain 11 underneath the special link or the bearing lug 22 is accomplished by the shaft 25 with a broaching member 32 arranged above by means of two screws with hexagonal recesses 28 or the like.

As particularly illustrated in FIG. 3, due to the equal disposition of the special links or the bearing lugs 22 of the endless chains 10, 11 relative to the direction of travel A of the machine 1, the counter edge members 29 with the holding fingers 23 and the broaching members 32 remain disposed in the direction of travel when moving from the guide wheels 12, 14 to the other guide wheels 14, 15 and back. In order to assure that a sufficient chain tension of the endless chains 10, 11 is always present, the guide wheels 12, 14 and/or 13, 15 are arranged displaceably and lockably by a non-illustrated clamping device on the supporting frame 5. The clamping device works continuously in an automatic fashion via springs or hydraulic devices in connection with a hydraulic cylinder or is adjusted by hand via threaded spindles or the like. Outside the zone of contact of the guide wheels 12–15, the endless chains 10, 11 are guided by guide plates 33,34 in the cutting and supplying area 35 of the machine 1. The guide plates 33, 34 are table-like, arranged approximately horizontally and transversely to the direction of travel A with the guide plate 33 underlying the extended part 23' of the holding finger 23 and the guide plate 34 underlying the broaching member 32. In order to accomplish a precise sliding guidance, the design of the holding fingers 23 and the broaching members 32 in the perpendicular plane relative to the direction of travel in connection with the special links or the bearing lugs 22 is chosen so that guide grooves 36, 37 are formed in the shape of an open U pointing opposite to the direction of travel. In the guide grooves 36, 37, the edges of the guide plates 33 and 34 are received. In order that the counter edge member 29 with the holding finger 23 and the broaching member 32 not be pulled off the guide plates 33, 34 in the direction of travel A when cutting the crop 2, the guide plate 33 has a sliding and/or roll guide 38 engaging into a cap-shaped recess 39 arranged in the extended part 23' of the holding finger 23 and extending in a plane perpendicular to the direction of travel, thus holding the counter edge members 29 back. Beneath the counter edge members 29, a knife holder 40 is arranged in the form of a guide track extending across the entire working area of the machine 1 transverse to the direction of travel A and parallel to the guide plates 34, 35. A cutting knife 41 is fastened onto the knife holder 40 by means of a couple of slotted flat-head screws which can, for example, have a hexagonal recess. As shown in the embodiment in FIG. 6 and 8, several cutting knives 41' can be arranged next to one another, as well. This has the advantage that when the knife is damaged, which as a cutting knife unit can be up to 2.5 m long, according to the width of the machine 1, only a part of the entire cutting knife has to be replaced. The knife is as long as the knife holder 40 and extends in the same direction. In an assembled state, the knife holder 40 and the cutting knife 41 form a flat sliding surface 43 on the side facing the counter edge member 29. The knife holder 40 with the cutting knife 41 and the guide plates 33, 34 are fastened to the supporting arm 5 and its slide guide 44, thereby providing additional stabilization. They likewise cover the ground in the cutting area of the cutting and supplying device 7 so that there is no loss of crop during the work process. A partial area of the counter edge member 29 rests on the cutting knife 41 and the knife holder 40 and slides over the stationary cutting knife 41 when the chains 10, 11 are rotating.

Each counter edge member 20 with the holding finger 23 is additionally associated with a brace 45 on the chain 10. The brace 45 is fastened to the side straps 46', 46" of the next chain link 46, as seen in the conveying direction B of the chain 10, the link being located in front of and on the respective special link or bearing lug 22. The brace 45 is formed as a fitting having approximately the height or width of the chain 10 and being formed generally U-shaped with the two legs 47, 48 being triangular and each welded respectively to the upper and lower side strap 46'46". Opposite to the conveying direction B, i.e. towards the counter edge member 29 and the holding finger 23, the brace 45 is open and the upper leg 47' has its edge located further back than the lower leg edge 48' and formed with serrations or a saw-tooth. For cost-effective reasons, the brace 45 with the side straps 46, 46" can be manufactured from one piece, which can be directly fastened or riveted when manufacturing the chains. The angle $\alpha$ (FIG. 7), formed between the center line d of the stretched chain 10 and the leg edge 47' of the brace 45 is approximately 90°.

When the chain 10 is rotating in the conveying direction B, the braces 45, because of their rigid connection with the chain links 46, follow a straight line, but in the deflection areas at the guide wheels 12, 13, the direction of motion of the chain links 46 changes so that the angle $\alpha$ at the guide wheel 12 increases to 180° and again decreases from 180° at the guide wheel 13.

In order for the crop 2 to be properly cut, held above the cutting point and supplied to the chopping machine in an approximately upright position, the counter edge member 29 and the holding finger have to have a special form with respect to the cutting knife 41 and the brace 45. Therefore, in the grasping and cutting area 49, the angle $\beta$ (FIG. 7) between the projected length 29' of the counter edge member 29 and the cutting knife 41 is preferably approximately 40°, opening up in the conveying direction B of the cutting and supplying device 7.

Figure 7:
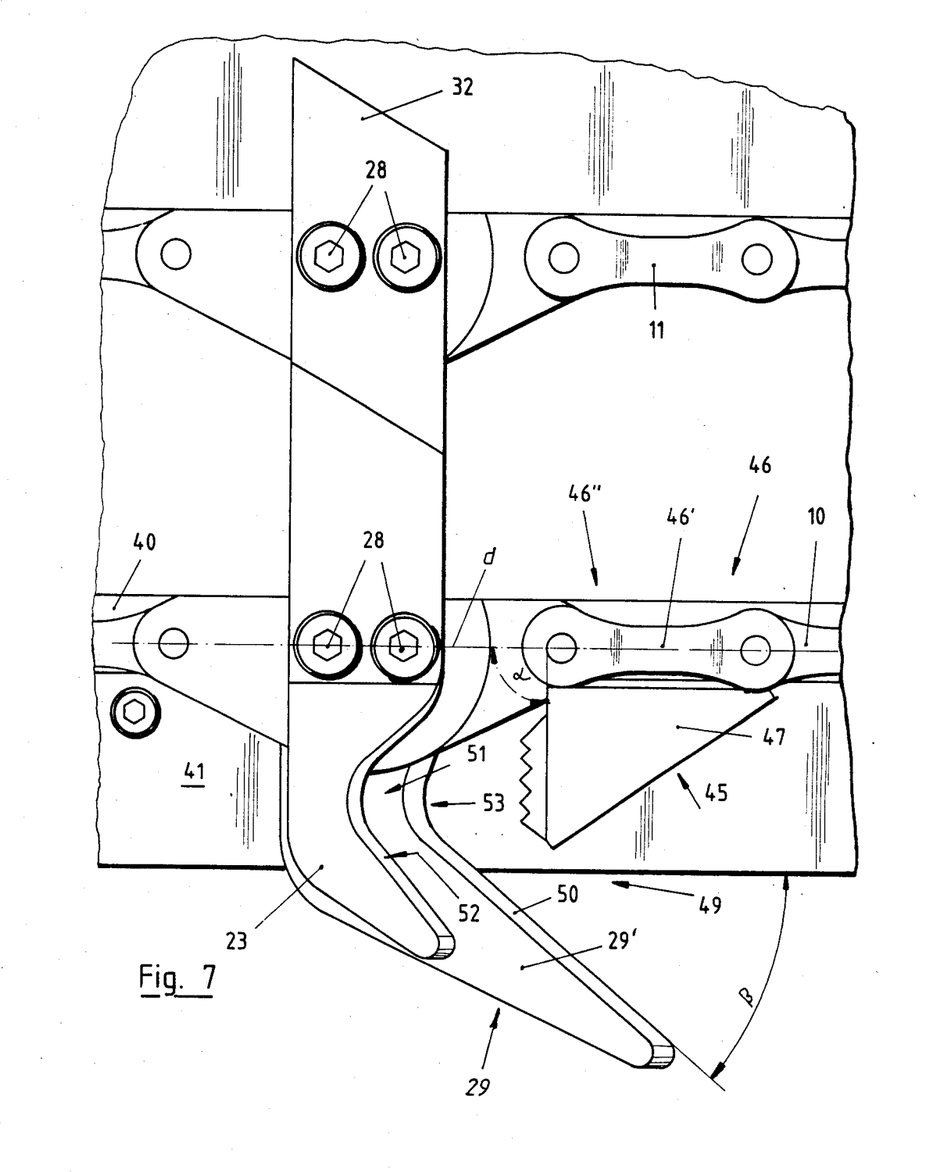
FIG. 7 is a plan view of a unit of the cutting and supplying device on a scale of 1:1.

As an additional feature, as particularly illustrated in FIG. 7, the cutting edge 50 of the counter edge member 29, forming a leg of the angle $\beta$, is extended in the merging area of the cutting knife 41, subsequently running in a curved fashion in the conveying direction B. The curved area 51 of the counter edge member 29 is arranged a distance from the cutting edge of the cutting knife 41 towards the the backside of the cutting knife that the corn stalk or similar crop 2, when being cut, can be pushed that far onto the cutting knife 41 until it is completely cut.

The shape of the holding finger 23 is adjusted to the shape of the counter edge member 29 with the difference that the holding finger 23 is somewhat shorter than the counter edge member 29 and located on a somewhat higher plane. The difference in height corresponds to the height of the special link or lug bearing 22. The holding finger 23 has an oblique anterior contact area 52, which is inclined opposite to the conveying direction B, changing into a curved recess 51 in the direction towards the backside of the cutting knife 41. The curved recess 51 of the holding finger 23 is arranged subsequent to the curved area 53 of the counter edge member 29 in the conveying direction B and serves to receive the cut-off crop 2.

Except for the part moving in the conveying direction B and, in particular, in the direction of the crop 2 to be harvested, the cutting and supplying device 7, as illustrated in FIGS. 1 and 2, is covered by cover and guide sheets 54, 55 so that broken off pieces of the crop 2, such as, for example corn or the like, broken off during the cutting of the crop 2, are always guided to the broaching members and supplied by these to the chopping machine 8. The main responsibility is carried by the cover and guide sheet 54 arranged transversely to the direction of travel A of the machine 1 above a partial area of the chain system 9 of the cutting and supplying device 7 and having such a shape that it is formed and arranged in an ascending fashion opposite to the direction of travel. It forms a slanting area onto which the crop can slide downwardly towards the broaching members 32 as in a funnel. The cover and guide sheet 55 simultaneously serves as outer stalk divider for the crop 2 which has not yet arrived in the working area of the machine 1, i.e. for the stationary remaining part of the crop 2.

The chopping machine for the cut-off crop 2, designated as a unit by the numeral 8, is also fastened to the supporting frame 5 and directed transversely to the direction of travel A of the machine 1, i.e., the four known slide-in rollers 56 or conveyor means, driven in an opposite direction in pairs, have axle centers disposed in the direction of travel A and directed approximately parallel to the ground. The slide-in rollers 56 are rotatably partially movably and elastically mounted in the side walls 57, 58 of a compression and cutting channel 59 by non-illustrated bearings, forming the upper and lower delineation of the compression and cutting channel 59. A chopping blower 60 is arranged subsequent to the compression and cutting channel 49 having, according to the invention, two concentric chopping and scoop wheels 61 and 62 rotating in a direction perpendicular or approximately prependicular to the travel plane with the direction of rotation in the area of the compression and cutting channel 59 being directed towards counter edges 63 and thus towards the ground (arrow b and c in FIG. 4).

The chopping and scoop wheels 61, 62 have their own mirror-image housing 64, 65 outside the area of the compression and cutting channel 59 with its own ejection channel 66, 67 and its own suction port 72, 73. The ejection channels 66, 67 are subsequently joined to a single ejection channel and extended from the rotatable and adjustable ejection cultivator 68 via the tractor 4. Furthermore, a housing back-wall 96 of the two housings 64, 65 forms the part of a drive housing 70.

The chopping knives 71 of both chopping and scoop wheels 61, 62 are arranged so that the counter edge 63 merges in succession and alternatingly with the chopping knives 71 engaging into one another during rotation and with the approximately perpendicular and circular surfaces being merged by the chopping knives 71, overlapping in a segment-like fashion in a border area, approximately in the lower, middle area of the compression and cutting channel 59 (seen in the conveying direction B).

The cooperation in the invention of two chopping and scoop wheels 61, 62 in the chopping machine 8 in combination with a joint compression and cutting channel 59 enables a low construction height of the chopping machine 8.

Figure 4:
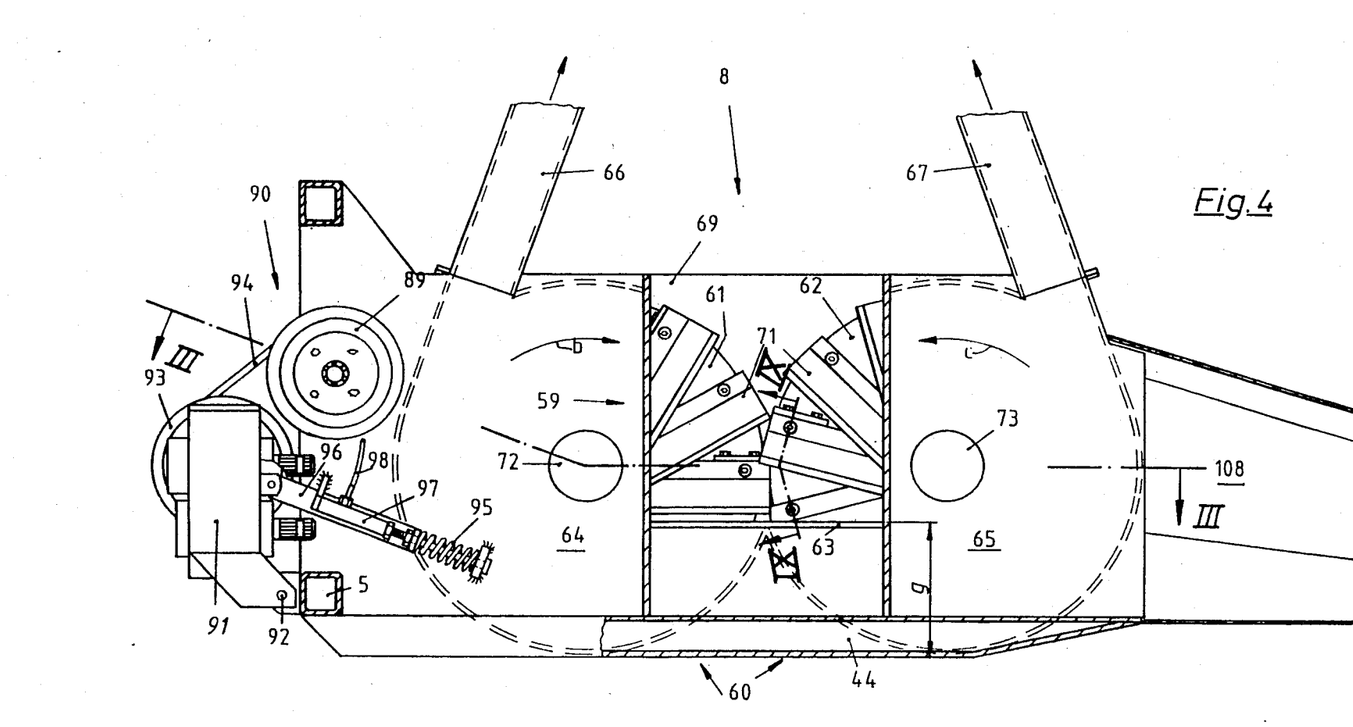
FIG. 4 is a cross-sectional view taken along the line IV—IV in FIG. 3, showing, in particular, the chopping blower.
Figure 5:
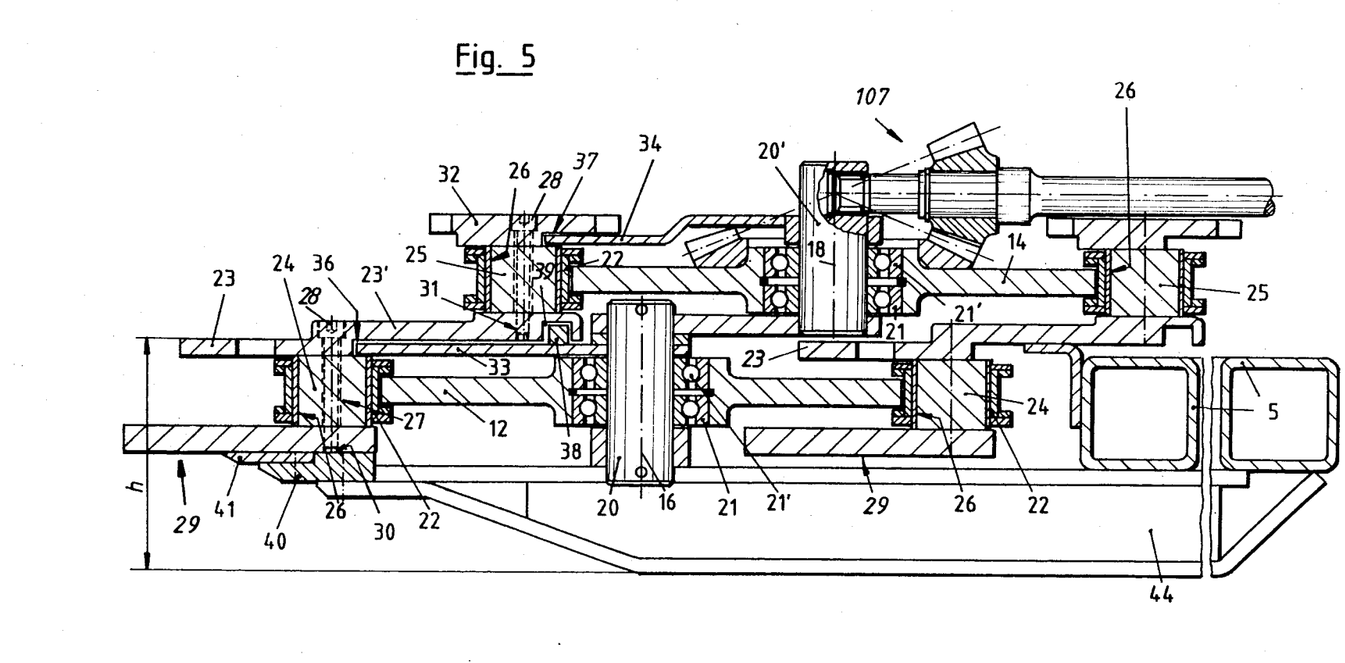
FIG. 5 is a cross-sectional view taken along the line V—V in FIG. 3 with the drive shaft of the angle drive pivoted in the sectional plane.

The counter edge 63 can be arranged very low towards the ground so that the height measurement g in FIG. 4 corresponds approximately to the height measurement h in FIG. 5 of the holding finger 23, as seen from the ground. The chain system 9 of the cutting and supplying device can thus be arranged parallel to the ground and the cutting knife 41 at a height which corresponds to the actual cutting height required of the crop 2 in practice. An intermediate conveyor, transporting the cut crop to a higher chopping device, as in already-known chopping machines, is therefore not required.

The drive housing 70 is part of a main drive 74 which is formed as a spur wheel drive and has several spur gears 77–82 mounted, for example, in grooved ball bearings 76 by shafts, in order to assure the correct direction of rotation of the chopping and scoop wheels 61, 62 and a lateral axial displacement from the drive 75. Drive shafts 83 and 84 are axially displaceable and lockable so that each chopping and scoop wheel 61, 62 with the chopping knives 71 can be engaged with the counter edges 63.

The drive of the machine 1 is accomplished from the tractor 4 by means of a drive shaft 6 via an angle drive 85 which preferably has two output pivots 86, 87 and with the housing of which is cubical with several screw-on areas so that the angle drive 85 can be mounted for a change of rotational direction of the drive shaft 6 (front attachment) by 180° in the perpendicular plane, the plane being tranverse to the direction of travel A. Furthermore, the angle drive 85 in the horizontal plane for a rotational speed change from approximatly 540 to 1000 rpm or vice versa can be rotatably mounted by 90°. The drive shaft 88 connects the angle drive 85 to the main drive 74. The shaft of a spur gear 82 of the main drive 74 extends in the direction of the drive shaft 88, and a V-belt pulley 89, having V-belt grooves staggered with different diameters, is rotation-resistantly mounted together with a friction wheel 90 which is coated, for example, with rubber. Transversely to the direction of travel A and laterally parallel to the compression and cutting channel 59, an additional drive 91 is pivotably mounted on the supporting frame 5 by means of a pivot 92 arranged tranversely to the direction of travel A.

Aligned with the V-belt pulley 89 and the friction wheel 90, an additional V-belt pulley 89', disposed 180° to the rotating plane, and a counter wheel 93 for the friction wheel 90, are fastened in a rotation-resistant fashion on the drive side of the drive 91. A V-belt 94 handles the drive transfer and the correct rotational speed (in the case of three V-belt grooves, there are three belts) of the drive 91. By means of a torsion spring 95 and a rod 96, the drive 91 is held or biased in a direction opposite to the direction of travel A and at the same time the V-belt 94 is stretched. A hydraulic cylinder 97 or the like, which can be supplied with a pressure medium supplied by the tractor driver via a supply conduit 98, serves to relax the V-belt 94 and to apply the counter wheel 93 to the friction wheel 90. In the case of the compression and cutting channel 59 being clogged up by crop, and a clogged cutting and supplying device 7, the rotational direction of the drive of these machine parts can thereby be reversed. The clogging can thus be eliminated by the tractor driver without him having to get off the tractor. The drive 90 has a couple of output pivots 99–103 in the direction of travel A, from which the slide-in rollers 56 of the compression and cutting channel 59 are driven via drive shafts 104.

By means of a drive shaft 105 and an angle drive 107 depicted by broken lines in FIG. 3 and supported in a bearing 106, the guide wheel 14 of the cutting and supplying device 7 is driven by an output shaft 103. From the guide wheel 14, the entire chain system 9 is put into rotation. It is preferable to drive only one guide wheel, preferably guide wheel 14, since it is accessible from above and located the closest to drive 91. Furthermore, a drive in the chain system 9 does not require an additional arrangement for synchronized operation so that it is the most cost-effective as well.

The entire chopping machine 8 with the exception of the anterior slide-in rollers 56 is enveloped in a cover and guide sheet 108 which is simultaneously formed as a stalk divider. As regards size, the chopping machine 8, measured transversely to the direction of travel A, is such that, in connection with a cover and guide sheet 108, when being cut loose, i.e., at the beginning of the chopping process on a new field, it can be guided by two stationary rows of crop 2 with one row being simultaneously cut and chopped to the cutting and supplying device.

Figure 6:
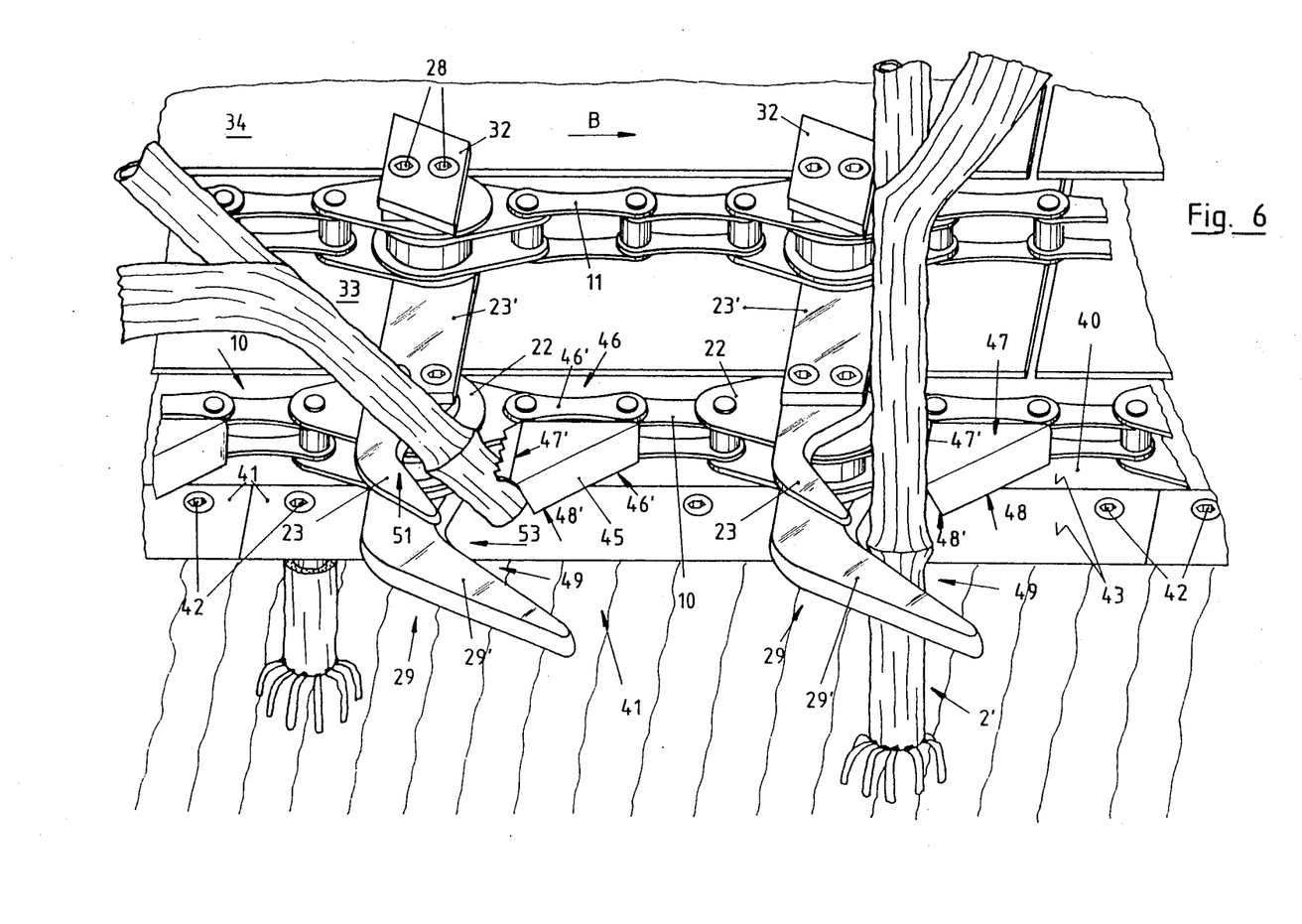
FIG. 6 is an enlarged perspective view of the cutting and supplying device at work as an individual unit Z outlined in FIG. 1.

During the chopping process on the field, the entire machine 1, for example, during the reverse travel of the tractor, is suspended by the three-point suspension 3 in a lowered position with the sliding drive 44 touching the ground lightly or only when the ground is uneven and is driven from the tractor 4 via the drive shaft 6. The cover and guide sheet 55, which is formed as a stalk divider, is guided or driven between two stationary rows of crop 2, for example corn or the like. If the field has to be cut loose first, the second cover and guide sheet 108, which is formed as a stalk divider as well, is driven between two additional rows of crop 2, spaced or staggered in the conveying direction B by approximately the measurement of the working width of the machine 1. In the case of a narrow and/or not evenly growing crop 2, the cover and guide sheets 55 and 108 move the crop 2 in a correspondingly lateral direction so that it is not broken off. Between the cover and guide sheets 55 and 108, that part of the chain system 9, which is not covered by the cover and guide sheet 54, moves in the conveying direction B at a speed which is adjusted to the speed of travel of the machine 1 in the direction of travel A. The crop 2, now present between the cover and guide sheets 55 and 108, is cut at any suitable point in this area and supplied to the chopping machine so that the corn stalk 2', as particularly illustrated in FIG. 6, is grasped by one of the counter edge members 29 in the grasping and cutting area 49 and brought forward to the cutting knife 41 in a shearing fashion. The corn stalk 2' is cut and simultaneously pushed onto the cutting knife 41 in the curved area 53 of the counter edge member 29. When being cut, corn stalk 2' is already supported by the holding finger 23 in the area of the curved recess 51. Because of its simultaneous movement in the grasping and cutting area 49 in the conveying direction B, the corn stalk 2' inclines opposite to the conveying direction B and is, after it has been completely cut, held by brace 45 (FIG. 6, left part). In this position, the corn stalk 2' is supplied to the catchment area of the chopping machine 8 in the conveying direction B. In the deflection area of the guide wheel 12, the brace 45 follows the direction of motion of the chain links 46 of the chain 10 so that the angle $\alpha$ is increased. The counter edge member 29 and the holding finger 23 maintain their direction in the direction of travel A. The corn stalk 2' is freed, falls into an approximately horizontal position and is simultaneously grasped by the slide-in rollers 56 of the chopping machine 8. These transport the corn stalk 2' in the compression and cutting channel 59 to the chopping blower 60, which, by means of the two chopping and scoop wheels 61, 62, rotating in a countercurrent fashion in the direction of arrows b and c (FIG. 4), in combination with the counter edge 63, chops this and collects it via the two ejection channels 66, 67 in a joint ejection bend 68 above the chopping blast in a non-illustrated container.

Since approximately every 0.2 m, a counter edge member 29, a holding finger 23 and a brace 45 are present on the endless chain 10, the previously-described process occurs and is repeated across the entire working area of the machine 1 so that there is always an entire bunch of corn stalks 2' being chopped in the chopping machine 8. These crop parts, which fall off when cutting the crop 2, for example corn particles, broken-off corn stalks and the like, are supplied to the broaching member 32 by the cover and guide sheets 54, 55, 108, which supply these crop particles to the chopping machine 1 via the table-like guide plates 33, 34. When the machine is clogged up, the previously-described arrangement of the drive 91, the rotational direction (arrow a) and the rotational direction of the slide-in rollers 56, can be changed by the driver of the tractor so that the clogging is eliminated by reversing the conveying direction B.

Figure 8:
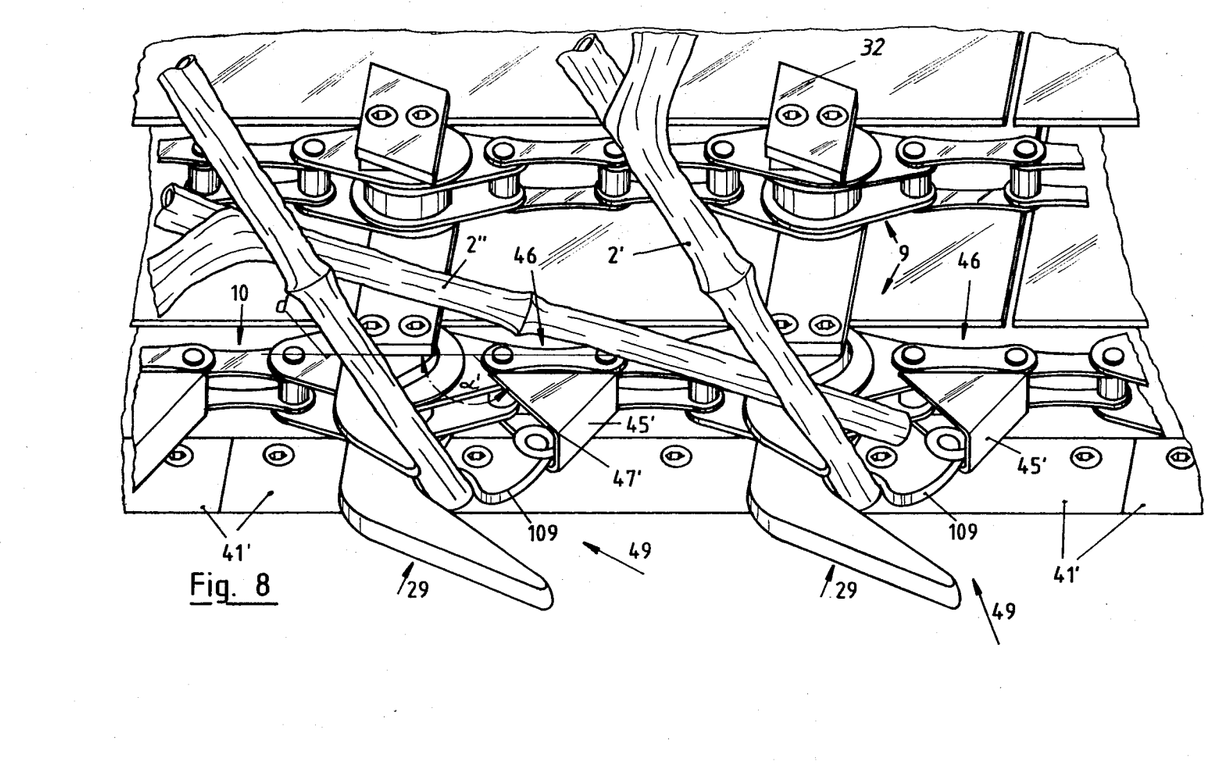
FIG. 8 is a perspective view similar to FIG. 6 of a modified embodiment.
Figure 9:
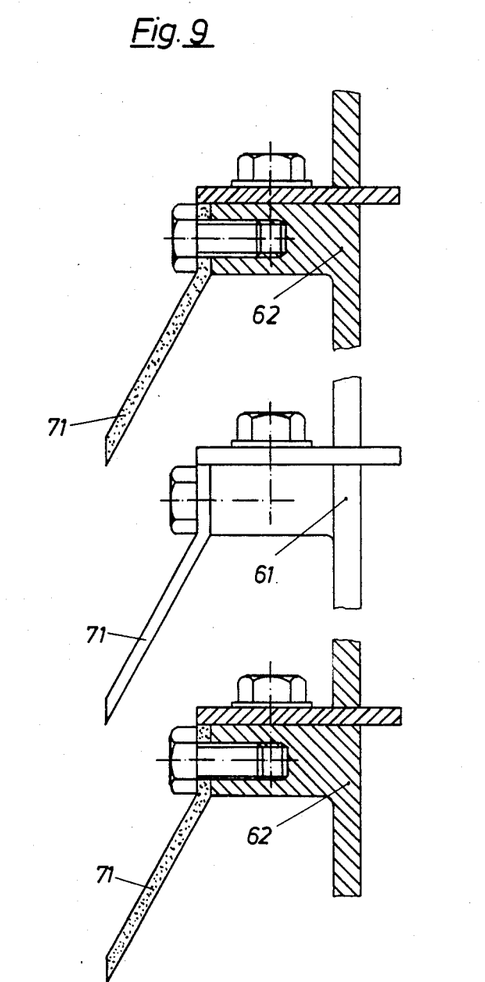
FIG. 9 is a partial cross-sectional view taken along line IX—IX in FIG. 4.
Figure 10:
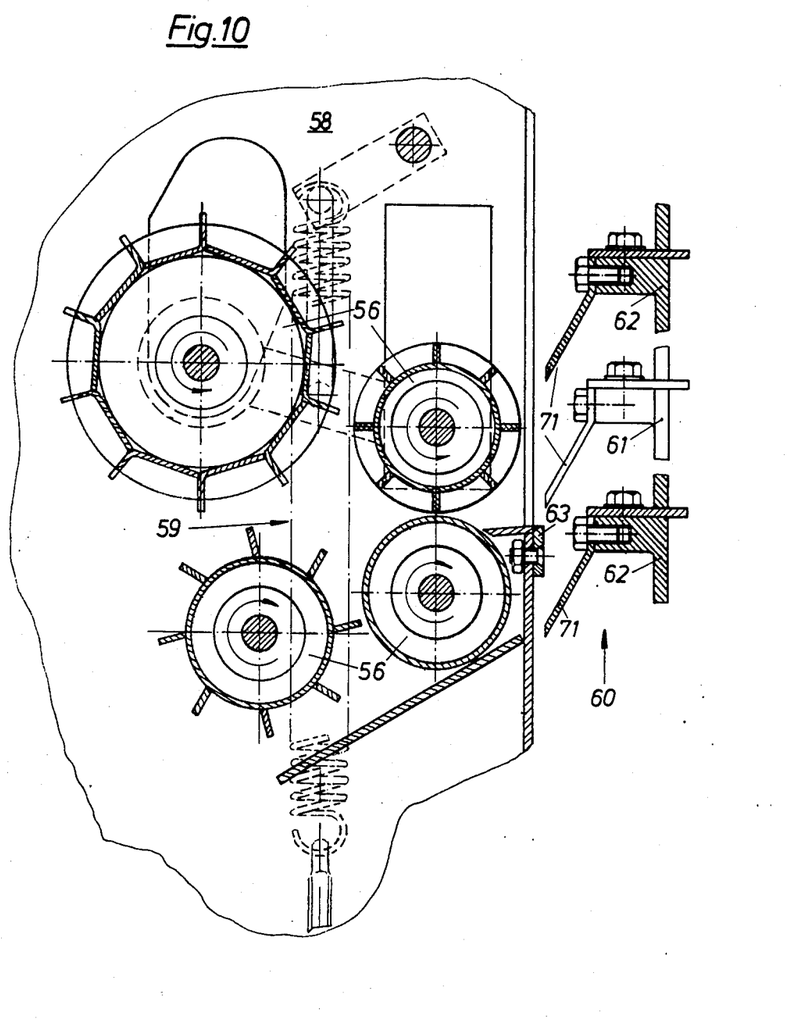
FIG. 10 is a partial cross-sectional view taken along line X—X in FIG. 3.

FIG. 8 illustrates an additional embodiment of a special brace. The angle $\alpha'$ between the center line d or the chain 10 and the leg 47' is approximately 140°. In and-/or on the brace 45', a torsion spring 109 or the like is fastened which preferably has a shape which resembles the Greek letter $\theta$ and with the elongated loop being fastened in or on the brace 45'. The torsion spring 109 can also be fastened directly on the chain link 46 of the chain 10 forming the brace itself. The advantage of this embodiment is that if, when cutting the crop 2, two corn stalks 2', 2" are simultaneously or successively grasped by a counter edge member in the grasping and cutting area 49 and supplied to the cutting knife 41, the first corn stalk 2" is pushed by the second corn stalk 2' further over the cutting knife 41 and ejected out of the brace 45' by torsion spring 109. The second corn stalk 2' can now be cut off completely and transported in the torsion spring 109 and the holding finger 23 in an upright position to the chopping machine. The corn stalk 2" is likewise supplied to the chopping machine on the chain system 9 or on the broaching member 32. Possible disturbances when using the machine 1 can thus be prevented.

The object of the invention is not limited to the above description and the embodiments shown in the drawings. Several other embodiments and modifications are feasible and possible within the framework of the claims. For example, there is the possibility of designing the supporting frame 5 with its connecting parts 5' so that it can receive the entire machine 1 as a side attachment next to the tractor 4. The supporting frame 5 can then be similar to the arrangement illustrated and described in DE-OS 21 16 583. The drive of the entire machine 1 is accomplished in a very simple fashion. After the drive shaft 88 has been removed from the driver of the main drive 74 and a part of the supporting frame 5 has been rotated with the machine 1 by 180°, the drive shaft 88 can again be mounted on an already-provided driver 110 with a spline profile. The machine 1 can then be driven via the side attachment and used in the field as already described.

What we claim is:

1. A machine for the harvesting of corn or similar stalk-like crops comprising a frame means, a cutting and supplying means mounted on said frame means and operable to cut said crop and convey the cut crop generally transversely of the direction of travel of the machine, said cutting and supplying means comprising a knife means extending transversely to the direction of travel of the machine, said cutting and supply means further comprising chain means, said chain means comprising two endless chains and two guide wheels for each endless chain, each of said guide wheels rotating around generally vertical axes with one of said chains being vertically spaced from the other chain, the two guide wheels for one of said chains being horizontally spaced from the two guide wheels of the other of said chains so that the two chains are staggered in different horizontal planes, each of said chains having parallel runs extending transversely of the direction of travel of said machine, and chopping means mounted on said frame means in a position to receive said cut crop after the latter has been conveyed transversely by said cutting and supplying means.

2. A machine according to claim 1, wherein said frame means has support means thereon to provide for a three-point suspension of said frame means from a tractor.

3. A machine according to claim 1, wherein said cutting and supplying means is operable to cut said crop and hold the cut crop above the cutting point approximately upright as the cut crop is conveyed to said chopping means.

4. A machine according to claim 1, wherein said cutting and supplying means is operable to cut said crop and hold the cut crop above the cutting point in a position inclined opposite to the conveying direction as the cut crop is conveyed to said chopping means.

5. A machine according to claim 1, wherein said cutting and supplying means comprises an endless movable chain means, and a knife means extending transversely to the direction of travel of the machine.

6. A machine for the harvesting of corn or similar stalk-like crops comprising a frame means, a cutting and supplying means mounted on said frame means and operable to cut said crop and convey the cut crop generally transversely of the direction of travel of the machine, said cutting and supplying means comprising endless chain means, counter edge members mounted on said chain means and movable with said chain means, a holding finger having a curved recess mounted on said chain means, said holding finger being offset relative to said counter edge member in a direction opposite to the conveying direction, and a brace means mounted on said chain means in a position forward of said counter edge member considered in the conveying direction, said holding finger and said brace means cooperating to hold the cut crop in an inclined disposition as the cut crop is conveyed to said chopping means, and chopping means mounted on said frame means in a position to receive said cut crop after the latter has been conveyed transversely by said cutting and supplying means.

7. A machine according to claim 1, wherein said two chains partially overlap and overly one another at two different points, said two chain means further comprising connecting means connecting the two chains at spaced locations along the two chains, and counter edge members mounted on said chain means and movable with said two chain means.

8. A machine according to claim 7, wherein one of said two chains constitutes a lower chain and the other of said two chains constitutes an upper chain, said counter edge member being mounted on said lower chain, a holding finger having a curved recess mounted on said lower chain, said holding finger being offset relative to said counter edge member in a direction opposite to the conveying direction, and a brace means mounted on said lower chain in a position forward of said counter edge member considered in the conveying direction, said folding finger and said brace means cooperating to hold the cut crop in an inclined disposition as the cut crop is conveyed to said chopping means 9. A machine according to claim 8, wherein said lower chain carries lower bearing lug link means comprising a lower shaft element and detachable mounting means detachably mounting said counter edge member and said holding finger on said lower shaft element.

10. A machine according to claim 9, wherein said upper chain carries an upper bearing lug link means comprising an upper shaft element, connecting means connected to said lower and upper shaft elements, said connecting means forming an extension of said holding finger, and broaching element mounted on said upper shaft element.

11. A machine according to claim 10, wherein said two chains have a front run and a rear run in passing between said guide wheels, said counter edge member, holding finger and broaching element always remaining in the same relative disposition when moving along said front and rear runs.

12. A machine according to claim 11, wherein each of said two chains comprises pivotably mounted links, one of said links being pivotably mounted to said lower bearing lug link means, said brace means being mounted on said one link, said brace means having a rear edge disposed at a first angle relative to the path of travel of said front run of said lower chain, said first angle increasing to a second angle as said one link reaches the guide wheel located at the end of said front run to thereby release the cut crop between said brace means and said holding finger, said angle being restored to said first angle when said one link begins said front run in leaving the guide wheel located at the beginning of said front run.

13. A machine according to claim 12, wherein said first angle is about 90 degrees and said second angle is about 180 degrees.

14. A machine according to claim 7 further comprising guide-support means for guiding and supporting said chain means along the run between said guide wheels.

15. A machine according to claim 14, wherein said guide-support means comprises plates which underline said chain means, said plates being connected to said frame means.

16. A machine according to claim 14 further comprising a guide element mounted on said guide-support means for supporting said counter edge member in a forward position.

17. A machine according to claim 16, wherein said guide element comprises a roller, said connecting means having an elongated channel which receives said roller.

18. A machine according to claim 1 further comprising drive means for driving one of said guide wheels, said one driven guide wheel thereby driving said two chains.

19. A machine according to claim 7, wherein a portion of said counter edge member overlies and rests on said knife means and slides over said knife means when in operation.

20. A machine according to claim 7, wherein said knife means has a cutting edge, said counter edge member having a portion projecting beyond said cutting edge at an angle of about 40 degrees relative to said cutting edge.

21. A machine according to claim 20, wherein said counter edge member has a curved portion leading to said projecting portion, said projecting portion moving the cut crop into said curved portion.

22. A machine according to claim 21, wherein said knife means has a cutting edge, said curved portion of said counter edge member being spaced from said cutting edge so that the crop is completely cut before the crop moves into said curved portion.

23. A machine according to claim 22 further comprising a holding finger mounted on said chamber means, said holding finger having a configuration similar to said counter edge member.

24. A machine according to claim 23, wherein said holding finger has a projecting portion and a curved portion, said curved portion of said holding finger being disposed rearwardly of the curved portion of said counter edge member considered in the conveying direction, said holding finger being disposed at a higher elevation than said counter edge member.

25. A machine according to claim 8, wherein said brace means is of the same height as that of said lower chain.

26. A machine according to claim 12, wherein said brace means and said one link on which said brace means is mounted are formed as one piece.

27. A machine according to claim 8, wherein said brace means has a generally U-shaped configuration with the open part of the U facing said holding finger.

28. A machine according to claim 27, wherein one leg of said U is longer than the other leg, said longer leg being the upper leg, said longer leg having a serrated edge for engaging the cut crop.

29. A machine according to claim 8 further comprising a torsion spring mounted on said brace means.

30. A machine according to claim 29, wherein said torsion spring generally has the configuration of the Greek letter $v$ and has an expended loop secured to said brace means.

31. A machine according to claim 8 further comprising a torsion spring secured directly to said lower chain to thereby form said brace means.

32. A machine according to claim 1, wherein said chopping means comprises a compression and cutting channel receiving the cut crop, two chopping wheels for chopping the cut crop, said two chopping wheels being rotatable about substantially horizontal axes extending in a direction perpendicular to the travel direction of the machine, said two chopping wheels rotating in a direction toward the ground in the area of said compression and cutting channel such that cut crop is fed to said chopping wheels through said compression and cutting channel.

33. A machine according to claim 32, wherein said chopping means further comprises a counter edge, said two chopping wheels each having rotating chopping knives cooperating with said counter edge to cut said crop.

34. A machine according to claim 33, wherein said chopping knives engage one another when rotating in a merged and segmented orientation.

35. A machine according to claim 32, wherein each of said two chopping wheels has a chopping wheel housing with one of said housings being a mirror image of the other housing outside the area of the compression and cutting channel, said housings each having an ejection conduit.

36. A machine according to claim 35 further comprising a single conduit into which said two ejection conduits merge.

37. A machine according to claim 32 further comprising a main drive means for synchronously driving said two chopping wheels.

38. A machine according to claim 37, wherein said two chopping wheel housings have a back wall which forms a part of a drive housing.

39. A machine according to claim 32, wherein each of said chopping wheels is axially displaceable to selected positions and lockable in said selection positions.

40. A machine according to claim 1 further comprising cover means covering the parts of the machine except the part of the conveying and supplying means which moves in the conveying direction and a receiving part of said chopping means.

41. A machine according to claim 40, wherein a portion of said cover means above said conveying and supplying means rises upwardly rearwardly relative to the direction of travel of the machine.

42. A machine according to claim 40, wherein portions of said cover means are formed as known stalk dividers.

43. A machine according to claim 40, wherein the portion of said cover means over said chopping means is formed as a stalk divider.

* * * * *